US012400771B2

(12) United States Patent
Nagai et al.

(10) Patent No.: US 12,400,771 B2
(45) Date of Patent: Aug. 26, 2025

(54) SCATTERING FAST NEUTRONS THAT HAVE PASSED THROUGH AN IRRADIATED FIRST SAMPLE TO GENERATE RADIOISOTOPES IN BOTH THE FIRST SAMPLE AND A SECOND SAMPLE

(71) Applicant: CHIYODA TECHNOL CORPORATION, Tokyo (JP)

(72) Inventors: Yasuki Nagai, Higashi-ibaraki-gun (JP); Masako Kawabata, Higashi-ibaraki-gun (JP)

(73) Assignee: CHIYODA TECHNOL CORPORATION, Tokyo (JP)

( * ) Notice: Subject to any disclaimer, the term of this patent is extended or adjusted under 35 U.S.C. 154(b) by 523 days.

(21) Appl. No.: 17/785,150

(22) PCT Filed: Feb. 12, 2020

(86) PCT No.: PCT/JP2020/005354

§ 371 (c)(1),
(2) Date: Jun. 14, 2022

(87) PCT Pub. No.: WO2021/161419

PCT Pub. Date: Aug. 19, 2021

(65) Prior Publication Data

US 2023/0050632 A1 Feb. 16, 2023

(51) Int. Cl.

| | |
|---|---|
| ***G21G 1/06*** | (2006.01) |
| ***G21K 5/04*** | (2006.01) |
| ***G21K 5/08*** | (2006.01) |

(52) U.S. Cl.

CPC ................ *G21G 1/06* (2013.01); *G21K 5/04* (2013.01); *G21K 5/08* (2013.01); *G21K 2201/068* (2013.01)

(58) Field of Classification Search

CPC .. G21G 1/06; G21K 5/04; G21K 5/08; G21K 2201/068

(Continued)

(56) References Cited

U.S. PATENT DOCUMENTS

| | | | |
|---|---|---|---|
| 8,090,072 | B2 | 1/2012 | Rubbia |
| 2010/0215137 | A1 | 8/2010 | Nagai et al. |

(Continued)

FOREIGN PATENT DOCUMENTS

| | | | |
|---|---|---|---|
| JP | 2010-223935 | A | 10/2010 |
| JP | 5522564 | B2 | 6/2014 |

(Continued)

OTHER PUBLICATIONS

Apr. 21, 2020 International Search Report issued in International Patent Application No. PCT/JP2020/005354.

*Primary Examiner* — Jack W Keith
*Assistant Examiner* — Daniel Wasil
(74) *Attorney, Agent, or Firm* — Oliff PLC

(57) ABSTRACT

A method and apparatus for producing radioisotopes. The method includes generating fast neutrons by irradiating a neutron producing target with a deuteron beam from a deuteron accelerator. These fast neutrons directly irradiate a first sample. The fast neutrons that pass through the first sample undergo multiple-scattering by a neutron scattering material made of a light element positioned around both the neutron producing target and the first sample. This arrangement generates various radioisotopes simultaneously in large amounts from both the first sample and a second sample through nuclear reactions. The method enables production of multiple radioisotopes in a single process for applications in medicine, research, education, agriculture, and industry.

3 Claims, 6 Drawing Sheets

(58) Field of Classification Search
USPC .................................................. 376/108, 158
See application file for complete search history.

(56) References Cited

U.S. PATENT DOCUMENTS

| | | | | |
|---|---|---|---|---|
| 2011/0194662 | A1 | 8/2011 | Nolen, Jr. et al. | |
| 2012/0300890 | A1 | 11/2012 | Piefer et al. | |
| 2021/0120661 | A1* | 4/2021 | Tatami ..................... | G21G 1/06 |
| 2021/0304914 | A1 | 9/2021 | Piefer et al. | |

FOREIGN PATENT DOCUMENTS

| | | | | | |
|---|---|---|---|---|---|
| JP | 5522565 | B2 | 6/2014 | | |
| JP | 5522566 | B2 | 6/2014 | | |
| JP | 5522567 | B2 | 6/2014 | | |
| JP | 5522568 | B2 | 6/2014 | | |
| JP | 5673916 | B2 | 2/2015 | | |
| JP | 2017-040653 | A | 2/2017 | | |
| WO | 2011/132265 | A1 | 10/2011 | | |
| WO | WO-2016037656 | A1 * | 3/2016 | ............... | G21G 1/06 |

* cited by examiner

FIG. 7

| | RI | $^{67}Cu$ | $^{65}Ni$ | $^{65}Zn$ | $^{69m}Zn$ | $^{67}Ga$ | $^{66}Ga$ | $^{64}Cu$ |
|---|---|---|---|---|---|---|---|---|
| | GENERATION REACTION | $(n, np + d)$ | $(n, \alpha)$ | $(n, 4n)$ | $(n, \gamma)$ | $(p, 2n)$ | $(p, 3n)$ | $(p, \alpha n)$ |
| | $E_{thr}$(MeV) | 7.9 | 0 | 28.7 | 0 | 12.2 | 23.6 | 7.9 |
| | SAMPLE | | | | | | | |
| A | $^{68}ZnO$ (NO SCATTERING MATERIAL) | 5.7 | 21 | 0.016 | 3.3 | 1.5 | 0.5 | 0.81 |
| B | $^{68}ZnO$(PE) ($d$ = 3 cm) | 5.4 | 33 | <0.021 | 67 | 65 | 11 | 62 |
| C | $^{68}ZnO$(PE) (6 cm) | 5.9 | 23 | 0.018 | 14 | 14 | 6.9 | 16 |
| D | $^{68}ZnO$(Pb) (3 cm) | 6.1 | 35 | 0.022 | 75 | 72 | 15 | 65 |
| E | $^{68}Zn$(PE) (3 cm) | 6.5 | 19 | 0.016 | 1.4 | 0.6 | 0.1 | 0.99 |
| F | (B-A)/A | − 0.05 | 0.6 | | 19 | 42 | 20 | 76 |
| G | (C-A)/A | 0.04 | 0.1 | | 3.2 | 8.3 | 12 | 19 |
| H | G/F = (C-A)/(B-A) | − 0.7 | 0.2 | | 0.2 | 0.2 | 0.6 | 0.25 |

FIG. 8

| | EXPERIMENTAL VALUES (Bq) | | | CALCULATION VALUES (Bq) | | |
|---|---|---|---|---|---|---|
| SAMPLE ANGLE | Au-198 | Au-196 | Lu-177 | Au-198 | Au-196 | Lu-177 |
| 0 | 7.5.E+04 | 2.5.E+04 | 2.0.E+05 | 2.0.E+05 | 1.8.E+05 | 1.6.E+05 |
| 60 | 8.3.E+04 | 5.2.E+02 | 2.0.E+05 | 2.0.E+05 | 4.4.E+03 | 1.6.E+05 |
| 90 | 7.9.E+04 | 1.2.E+02 | —— | 2.0.E+05 | 5.1.E+02 | 1.4.E+05 |

SCATTERING FAST NEUTRONS THAT HAVE PASSED THROUGH AN IRRADIATED FIRST SAMPLE TO GENERATE RADIOISOTOPES IN BOTH THE FIRST SAMPLE AND A SECOND SAMPLE

TECHNICAL FIELD

The present invention relates to a method and apparatus for producing radioisotopes, and in particular, to a new method and apparatus for producing radioisotopes that can generate various radioisotopes in large amounts at the same time.

BACKGROUND ART

Radioisotopes (hereinafter also referred to as RIs) are used in medicine, research, education, agriculture, industry, and other fields, and have been produced using nuclear reactors and accelerators for research purposes. As a result, the use of RIs in these fields is expanding and the new and unprecedented need for RIs is increasing. On the other hand, there has been a reduction in RI generation activities in aging research reactors, and the development of an alternative production method to the existing reactor production method for RIs and a new method and apparatus for generating RIs is an urgent issue.

The inventors have proposed an RI production technology using accelerator based neutrons source in Patent Literatures 1 to 6 as an RI production technology that can efficiently and inexpensively generate and stably supply RIs without using nuclear fuel materials or without an occurrence of a large amount of radioactive waste constituted of a wide range of isotopes with high intensity and long half-lives. As illustrated in FIG. 1, a neutron producing target 20, which is composed of carbon C and beryllium Be, is irradiated with a beam of deuterons (hereinafter referred to as a "deuteron beam") 12 accelerated by a deuteron accelerator 10 to generate neutrons (referred to as accelerator based neutrons or fast neutrons) 22, and a sample 30 is directly irradiated with the accelerator based neutrons 22 to generate RIs.

As is apparent from FIG. 1, this production technology does not use a material covering the neutron producing target 20 and the sample 30.

On the other hand, Patent Literature 7 describes that an internal diffusion medium region made of heavy elements such as lead Pb and bismuth Bi is prepared around a neutron source and an activation region is made therearound, in order to first reduce neutron energy by inelastic scattering.

CITATION LIST

Patent Literature

Patent Literature 1: Japanese Patent No. 5673916
Patent Literature 2: Japanese Patent No. 5522564
Patent Literature 3: Japanese Patent No. 5522565
Patent Literature 4: Japanese Patent No. 5522566
Patent Literature 5: Japanese Patent No. 5522567
Patent Literature 6: Japanese Patent No. 5522568
Patent Literature 7: U.S. Pat. No. 8,090,072B2

SUMMARY OF INVENTION

Technical Problem

Conventionally, however, only limited types of radioisotopes can be generated and, in many cases, only in small amounts.

The present invention was made to solve the above-described conventional problems, and aims to provide a new RI production technology that can generate various radioisotopes in large amounts at the same time.

Solution to Problem

To solve the above problems, the present invention includes: generating neutrons by irradiating a neutron producing target with a deuteron beam accelerated by a deuteron accelerator; directly irradiating a first sample with the fast neutrons produced in the neutron producing target; and multiple-scattering fast neutrons, which have initially been scattered by a nuclear reaction in the first sample and have passed through the first sample, by a neutron scattering material made of a light element disposed around the neutron producing target and the first sample to generate, through a nuclear reaction with the first sample and a second sample, various radioisotopes in large amounts at the same time from the first sample and the second sample.

When first neutron sources are defined by the fast neutrons whose energy and/or traveling directions are/is changed by being scattered by the neutron scattering material, second neutron sources are defined by intense neutrons generated by a nuclear reaction of the first neutron sources with the first sample, and charged particle sources are defined as charged particles with high energy generated by a nuclear reaction of the first neutron sources with the first sample, the first and second samples disposed in space within the neutron scattering material are irradiated with the first neutron sources, the second neutron sources, and the charged particles sources. Neutrons emitted from the first and second neutron sources are not only applied to the first and second samples, but also scattered again by the neutron scattering material because of the high penetrating power of the neutrons. Such scattering continues until neutrons with a half-life of 10 minutes are either converted to protons or disappear by being captured by the neutron scattering material and the samples by an (n, γ) reaction (multiple-scattering). The multi-scattered neutrons are multiply applied to tie first d second samples, and each application contributes to the generation of RIs. Since the multi-scattered neutrons in the neutron scattering material are omnidirectional, the effective intensity the neutrons to be applied to the first and second samples decreases with each scattering. On the other hand, the reaction cross section where the neutrons are applied to the samples and generate RIs by the (n, γ) reaction increases with decrease in neutron energy. For example, when the samples are Au-197 (197Au), the neutron energy is proportional to the reciprocal or a neutron velocity from a thermal neutron (0.025 electron volts eV) to about 1 MeV. Therefore, the intensity of the neutrons generating RIs by multiple-scattering decreases, and the neutron energy is lowered, but the production cross section becomes larger. Therefore, the contribution of the neutrons to generate RIs by multiple-scattering is important and cannot be ignored.

The neutron scattering material can be polyethylene, water, or paraffin.

The neutron scattering material can be in such a shape as to enclose the neutron producing target, the first sample, and the second sample.

The first sample can be a laminated sample.

The second sample can include a sample for generating short-lived radioisotopes disposed in a position facing the first sample, and a sample for generating long-lived radioisotopes disposed in a position facing the neutron scattering material behind the sample for generating short-lived radioisotopes.

The present invention provides an apparatus for producing radioisotopes including: a deuteron accelerator; a neutron producing target irradiated with a deuteron beam accelerated by the deuteron accelerator; a first sample directly irradiated with fast neutrons produced in the neutron producing target; a neutron scattering material made of a light element disposed around the neutron producing target and the first sample, the neutron scattering material being configured to multi-scatter the fast neutrons, which have initially been scattered by a nuclear reaction in the first sample and have passed through the first sample; and a second sample disposed in a space within the neutron scattering material, wherein various radioisotopes are generated in large amounts at the same time from the first and second samples.

Advantageous Effects of Invention

According to the present invention, is possible to provide a new RI production technology that can generate various radioisotopes in large amounts at the same time.

BRIEF DESCRIPTION OF DRAWINGS

FIG. 7 is a table illustrating RI generation amounts for comparison between cases in which the $^{68}$ZnO and $^{68}$Zn samples are covered and uncovered with a polyethylene scattering material or lead scattering material according to the embodiment; and FIG. 8 is a table illustrating, in comparison, experimental results and calculation results of the dependence of generation amounts of $^{198}$Au and $^{177}$Lu on location of $^{197}$Au and $^{176}$Lu samples in the polyethylene scattering material according to the embodiment.

DESCRIPTION OF EMBODIMENTS

An embodiment of the present invention will be described in detail below with reference to the drawings. Note that, the present invention is not limited by the following contents described in the embodiment and examples. Also, configuration requirements in the embodiment and examples described below include those that can be easily assumed by those skilled in the art, those that are substantially the same, and those that are within the scope of so-called equivalents. Furthermore, the components disclosed in the embodiment and examples described below may be combined or selected as appropriate.

Figure 1:
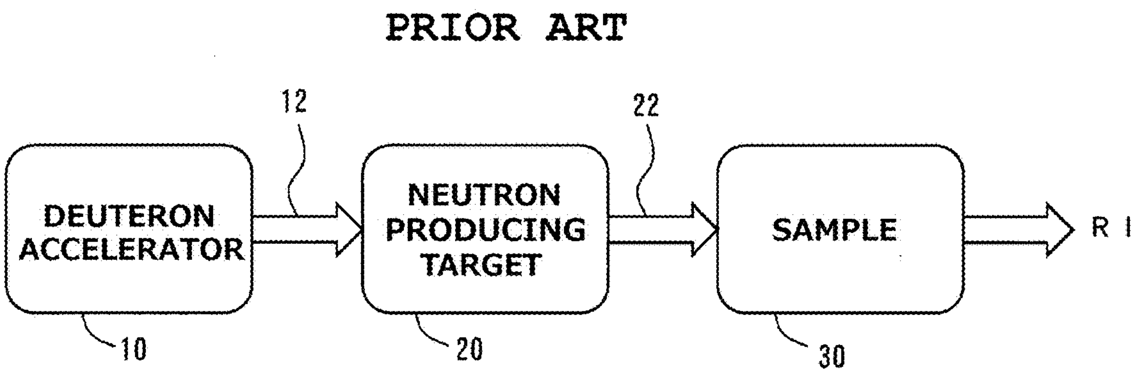
FIG. 1 is a diagram schematically illustrating a conventional RI generation technology using accelerator based neutrons.
Figure 2:
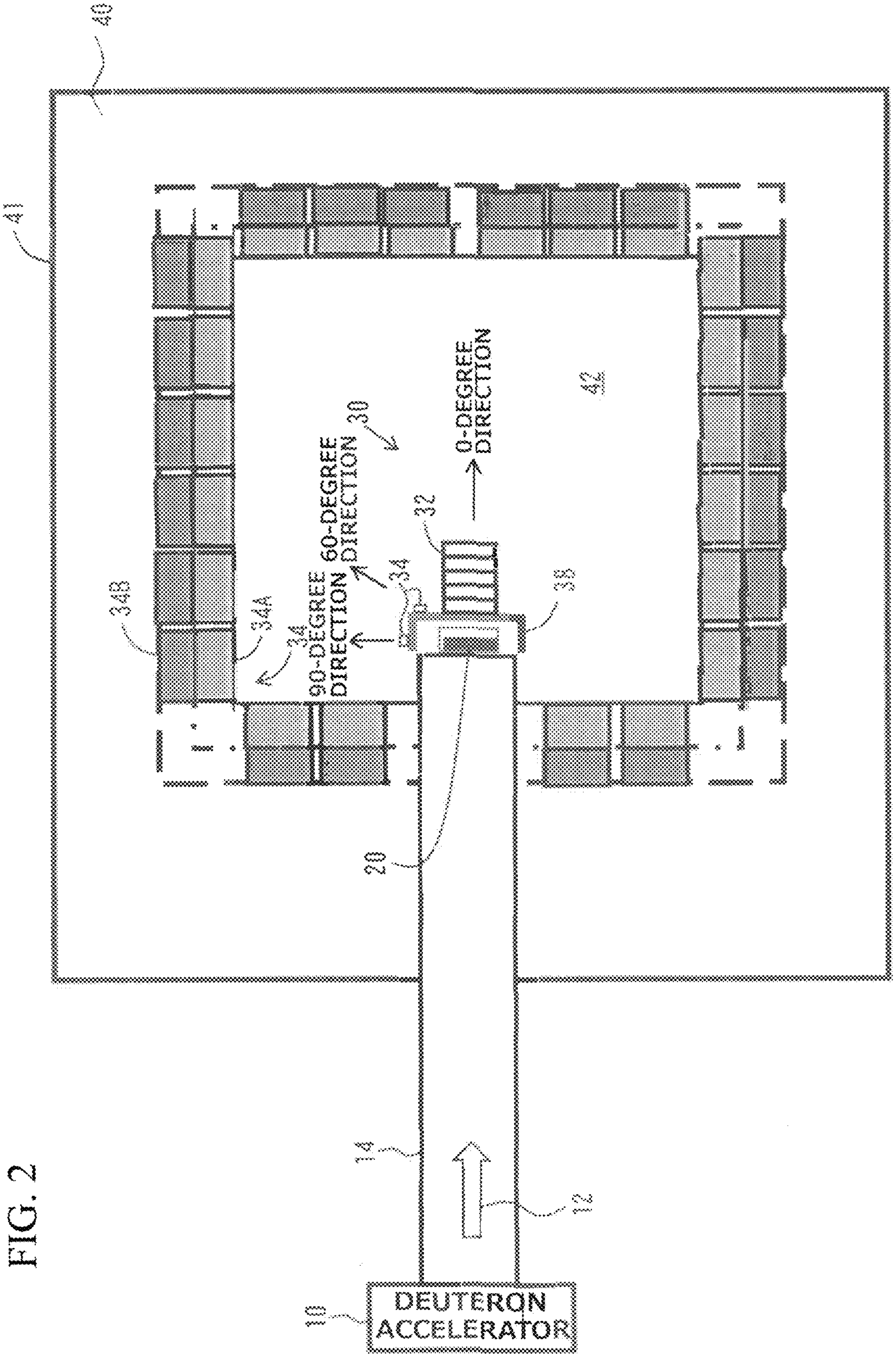
FIG. 2 is a cross-sectional view schematically illustrating an embodiment of the present invention.
Figure 3:
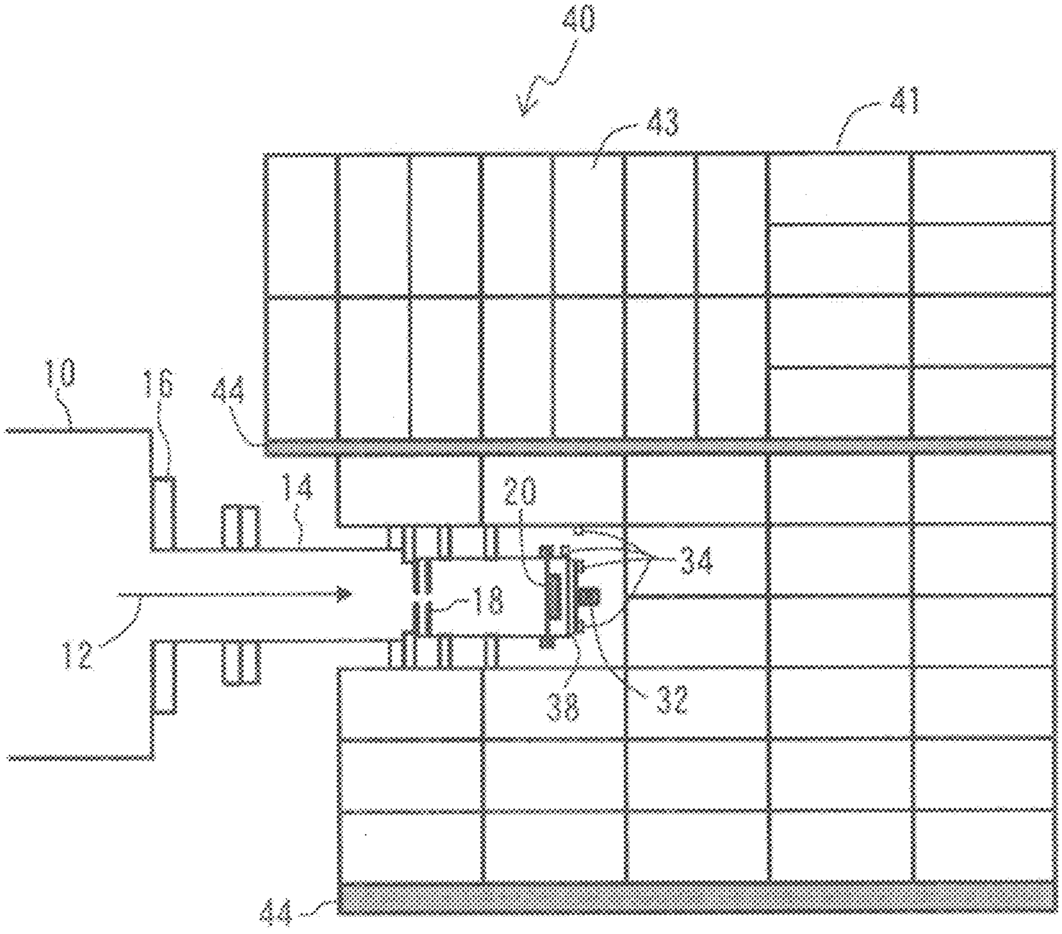
FIG. 3 is a cross-sectional view of a specific example of the overall configuration of the embodiment.
Figure 4:
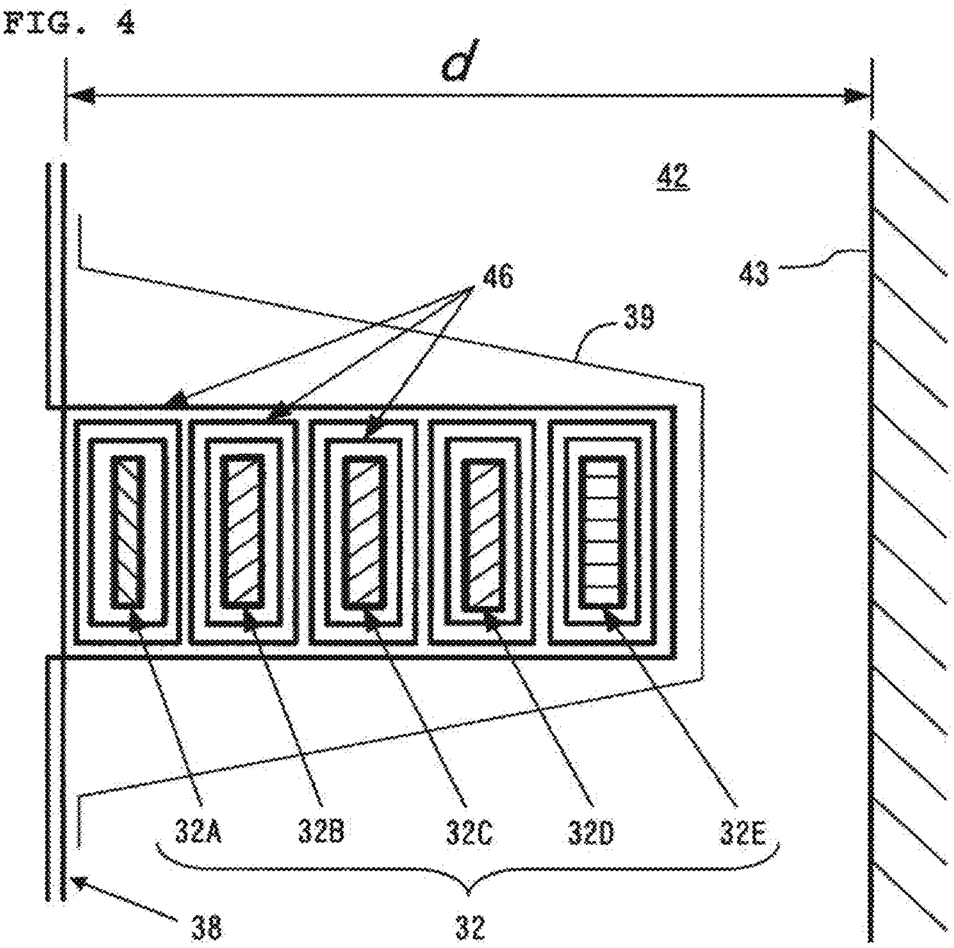
FIG. 4 is an enlarged cross-sectional view illustrating first samples in detail according to the embodiment.

As illustrated in FIG. 2 (schematic cross-sectional view), FIG. 3 (cross-sectional view illustrating a specific example of the overall configuration), and FIG. 4 (enlarged cross-sectional view illustrating the first samples in detail), the present embodiment includes a deuteron accelerator 10; a neutron producing target 20 that is irradiated with a deuteron beam 12 accelerated by the deuteron accelerator 10 through a beam pipe line 14; laminated samples 32 that are first samples 30 irradiated with fast neutrons 22 (refer to FIG. 5) produced by the neutron producing target 20; a neutron scattering chamber (also simply referred to as a scattering chamber) 41, which is constituted of a neutron scattering material (also simply referred to as a scattering material) 40 made of a light element disposed around the neutron producing target 20 and the laminated samples 32, to scatter fast neutrons 22A (refer to FIG. 5) having passed through the laminated samples 32 by a nuclear reaction in the laminated samples 32; second samples 34 that are disposed inside the neutron scattering chamber 41 e.g. a rectangular parallelepiped scattering medium 42; and samples 34A for generating short-life RIs and samples 34B for generating long-life RIs that constitute part of the second samples 34.

In the drawings, the reference numeral 38 indicates a holder made of aluminum, for example, to support the laminated samples 32. The reference numeral 39 indicates a sample holding jig that is fixed to the holder 38 and is made of polypropylene containing carbon C, for example, in order to prevent the holder 38 from being electrical charged and discharging electrical charges into the samples due to having electrical conductivity. The material of the holder 38 is preferably resistant to activation by strong neutrons and has an activated main RI component with a short half-life.

The second samples 34 may be directly fixed to the neutron scattering material 40 as exemplarily illustrated in FIGS. 2 and 3, as well as being secured to the holder 38 as exemplarily illustrated in FIGS. 2 and 3.

In FIG. 3, the reference numeral 16 indicates a flange for connecting the beam pipe line of the deuteron accelerator 10. The reference numeral 18 indicates a slit for irradiating only the neutron producing target 20 with the deuteron beam 12 after narrowing the beam size of the deuteron beam 12.

A light element such as beryllium, carbon, or lithium, for example, can be used as the neutron producing target 20.

As illustrated in FIG. 4 in detail, the laminated samples 32 include five laminated disk-shaped samples 32A, 32B, 32C, 32D, and 32E, which are each enclosed with, for example, a polyethylene film 46 with a thickness of 40 μm to provide conductivity and for positioning, and laminated.

As the first laminated sample 32A, for example, $^{93}$Nb for monitoring can be used. As the second laminated sample 32B, an oxide, for example, $^{68}$ZnO, can be used. As the third laminated sample 32C, an oxide, for example, $^{64}$ZnO, can be used. As the fourth laminated sample 32D, a oxide, for example, $^{nat}$ZnO in its natural world, can be used. As the fifth laminated sample 32E, an oxide, for example, $^{90}ZrO_2$, can be used.

In the neutron scattering material 40, as illustrated concretely in FIG. 3, polyethylene blocks 43 of an easy-to-handle predetermined size are laminated on aluminum supports 44, for example.

In FIG. 4, d represents the distance (cm) between the holder 38 and the polyethylene block 43. The value of d can be, for example, within around 20 cm from a rear end (32E in FIG. 4) of the laminated samples.

The samples 34A for generating short-life RIs illustrated in FIG. 2, which constitute part of the second samples 34, are disposed in positions facing the laminated samples 32 in, for example, the rectangular parallelepiped scattering medium 42 in the neutron scattering chamber 41 formed by the neutron scattering material 40. The samples 34B for generating long-life RIs are disposed in positions facing the neutron scattering material 40 behind the samples 34A for generating short-life RIs.

The neutron irradiation time to generate RIs using the samples 34B for generating long-life RIs may be longer than that to generate RIs using the samples 34A for generating short-life RIs. Therefore, it is preferable that the fixture of these samples 34A and 34B, especially fixture of the samples 34B to the neutron scattering material 40 can be easily and independently replaced.

The second samples 34, 34A, and 34B are disposed in the scattering medium 42 of the neutron scattering material 40 so as not to interfere with each other. The second samples may be identical or different from each other within their respective reference numerals.

The size of each sample may be, for example, 1 to 4 cm in diameter and up to 10 mm in thickness, and the distance between the samples can be, for example, within about 5 mm, for example.

Figure 5:
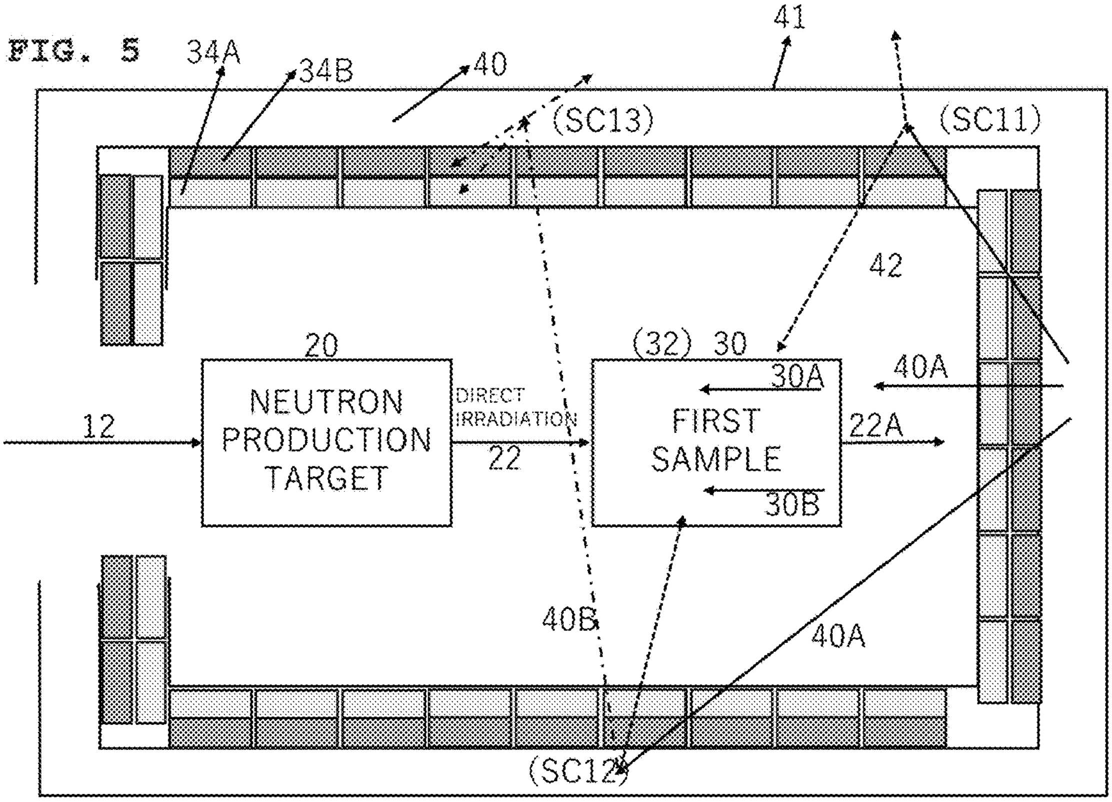
FIG. 5 is a drawing schematically illustrating generation of neutrons and charged particles in the embodiment.

Action will be described below with reference to FIG. 5.

First, the neutron producing target 20 made of a light element such as beryllium, carbon, or lithium is irradiated with the deuteron beam 12 produced by the deuteron accelerator (not illustrated), to generate the fast neutrons 22.

Next, the laminated samples 32 including the various samples serving as the first samples 30 are directly irradiated with the fast neutrons 22.

The neutrons 22A that have passed through the first samples 30 produce a nuclear reaction with the scattering material 40, which is disposed to cover the neutrons 22A and the first samples 30 and is made of a light elemental material such as polyethylene. After the nuclear reaction is produced, the first samples 30 and the various second samples 34 disposed in positions other than the positions of the first samples 30 are irradiated with the scattered neutrons to cause various types of nuclear reactions. When the energy of the deuterons is several tens of MeV or higher, compared to the case of not disposing the scattering material 40 made of the above-described light elemental material such as polyethylene, various RIs are generated in large amounts at the same time by the following nuclear reactions.

The first samples 30 are disposed in positions, mainly in the direction of deuterons (the direction of 0 degree), that are effectively irradiated with the emitted fast neutrons 22 (in other words, the positions when, assuming the cross-sections of the first samples 30 are circular, the centers of the first samples 30 are at 0 degree). The production of RIs in the first samples 30 proceeds as follows. Of the fast neutrons 22 emitted in the process above, neutrons incident on the first samples 30 produce a nuclear reaction with the first samples 30. Then, most of the neutrons pass through the first samples 30, and, as the fast neutrons 22A, are reflected after producing nuclear reaction with the scattering material 40. The reflected neutrons are re-irradiated back to the first samples 30 and mainly produce a nuclear reaction with the first samples 30, resulting in generation of protons (hereinafter abbreviated to p) and neutrons (hereinafter abbreviated to n). The protons p produce RIs through the nuclear reactions (p, n), (p, 2n), (p, 3n), (p, αn), and the like between the protons and the first samples 30, while the neutrons n produce RIs by a neutron capture nuclear reaction (hereinafter abbreviated as (n, γ)) in which gamma rays (hereinafter abbreviated as γ) are instantaneously emitted after the first samples 30 are irradiated with the neutrons n. Here, the (p, n) reaction represents a nuclear reaction in which one neutron n is instantaneously emitted after a sample is irradiated with a proton. Similarly, (p, αn) represents a reaction in which one alpha particle (hereafter abbreviated as α) and one neutron n are instantaneously Emitted after a sample is irradiated with a proton. Since neutrons have a high ability to penetrate through materials, the first samples 30 are not limited to a single sample, but can be many samples skewered and disposed. As a result, various RIs can be produced at the same time. This means that RIs can be produced with a high cost performance to meet the needs of various users.

On the other hand, the second samples 34 are disposed in positions that are not directly irradiated with the fast neutrons 22 emitted mainly in a 0-degree direction (or in the direction away from the 0-degree direction where the proportion of direct irradiation is very small). The production of RIs in the second samples 34 proceeds as follows. Of the fast neutrons 22 emitted in the 0-degree direction in the above process, neutrons incident on the first samples 30 produce a nuclear reaction with the first samples 30. Then, most of the neutrons pass through the first samples 30, and, serving as the fast neutrons 22A, are reflected after producing a nuclear reaction with the scattering material 40. The reflected neutrons n generate RIs by a (n, γ) reaction in which gamma rays are instantaneously emitted after the second samples 34 are irradiated with the neutrons n. The second samples 34 can be disposed in the scattering chamber 41, which is covered with the scattering material 40 made of the light elemental material such as polyethylene, in a quantity that can be installed. Each of the second samples 34 can be newly provided with a neutron moderator while taking in consideration the reaction cross section of a (n, γ) reaction to increase production volume.

Since, as described above, the first samples 30 are quite transparent to neutrons, a significant amount of the neutrons applied to the first samples 30 pass through the first samples 30 and become the fast neutrons 22A. The neutron scattering material 40 and the not-illustrated second samples are thus irradiated with the fast neutrons 22A.

The neutron producing target 20 and the first samples 30 are enclosed by the neutron scattering material 40 made of a light elemental material such as polyethylene, water, or beryllium. Here, the fast neutrons 22A whose energy and traveling directions are changed as a result of being scattered by the neutron scattering material 40 are defined as first neutron sources 40A.

Furthermore, when the first neutron sources 40A produce a nuclear reaction with the first sample 30 and become second neutron sources 30A, neutrons 30B with more intense than the fast neutrons 22 and 22A (hereinafter referred to as "intense neutrons") are generated. The first samples 30, the neutron scattering material 40, and the not-illustrated second samples are irradiated with the intense neutrons 30B.

In addition, the first neutron sources 40A produce a ear reaction with the first samples 30 and become charged particle sources 30C to generate high-energy charged particles 30D of considerably high intensity. The first samples 30 and the not-illustrated second samples are also irradiated with the charged particles 30D.

The charged particles 30D are generated in a different from the charged particles obtained by accelerating charged particles in an accelerator, from the charged particles generated by a nuclear reaction that occurs when the first samples 30 are directly irradiated with the fast neutrons 22.

The charged particles 30D are obtained by a nuclear reaction between the first neutron sources 40A and the first samples 30.

Furthermore, the neutrons emitted from the first neutron sources 40A and the second neutron sources 30B are not only applied to the first and second samples 30 and 34, but also scattered again by the neutron scattering material 40 because of the high penetrating power of the neutrons. Such scattering continues until neutrons with a half-life of 10 minutes are either converted to protons or disappear by being captured by the neutron scattering material 40 and the samples 30 and 34 in an (n, γ) reaction (multiple-scattering). The multi-scattered neutrons are applied to the first and second samples 30 and 34, where each application contributes to the generation of RIs. In FIG. 5, for example, the reference numeral SC13 represents that the first neutron is scattered at a position 3 of the neutron scattering material 40. Note that, there are innumerable positions in the neutron scattering material 40 corresponding to an origin of the first neutron source 40A and the position 3. Furthermore, the above-mentioned scattering (multiple-scattering) continues until neutrons with a half-life of 10 minutes are either converted to protons or disappear by being captured by the neutron scattering material 40 and the samples 30 and 34 in an (n, γ) reaction.

Since the neutrons multi-scattered by the neutron scattering material 40 are omnidirectional, the effective intensity of the neutrons to be applied to the first and second samples 30 and 34 decreases with each scattering. On the other hand, the reaction cross section where the neutrons are applied to the samples 30 and 34 and generate RIs by the (n, γ) reaction increases with a decrease in neutron energy. For example, when the samples 30 and 34 are An-197 (197Au), the neutron energy is proportional to the reciprocal of a neutron velocity which ranges from a thermal neutron (0.025 electron volts eV) to about 1 MeV. Therefore, the intensity of the neutrons generating RIs by multiple-scattering decreases, and the neutron energy is lowered, but the production cross section becomes larger. Therefore, the contribution of the neutrons to generate RIs by multiple-scattering is important and cannot be ignored.

In generation of the second neutron sources 30A and the charged particle sources 30C, the first sample 30 (32) of, for example, an oxide $^{68}$ZnO can generate more intense neutron sources and charged particle sources than the first sample 30 (32) of a metal $^{68}$Zn. An oxide-containing sample is thus sometimes desirable to be used as the first sample 30 (32).

As the first sample 30 (32), all naturally available stable isotopes can be used. These may be either isotopes whose isotope abundance ratio is equal to a natural isotope abundance ratio or enriched isotopes. As a stable isotope material, an oxide is sometimes desirable to be used when an oxide is available.

RIs generated by a reaction of neutrons with samples have the following characteristics depending on the positions of the samples.

(1) When the various samples are disposed in a traveling direction of deuterons (defined as the 0-degree direction; refer to FIG. 2) in a multilayered manner such as the laminated sample 32, RIs generated by an oxygen compound sample, including RIs by a reaction of protons and neutrons with the samples, have several times higher radioactivity intensity than that without a neutron scattering material.

(2) When the various samples are disposed in a direction different from 0 degree (for example, a 60-degree or 90-degree direction; refer to FIG. 2), RIs are generated by the second samples capturing the scattered neutrons 40B emitted from the first neutron sources 40. The RIs have intensity reflecting that the energy and intensity of scattered neutrons in the rectangular parallelepiped scattering medium 42 in the neutron scattering chamber 41 formed of the polyethylene blocks 43 are uniform.

Results related to (1) above will be described for deuteron energies of 50 MeV and 40 MeV.

(1a) Deuteron Energy of 50 MeV

Figure 6:
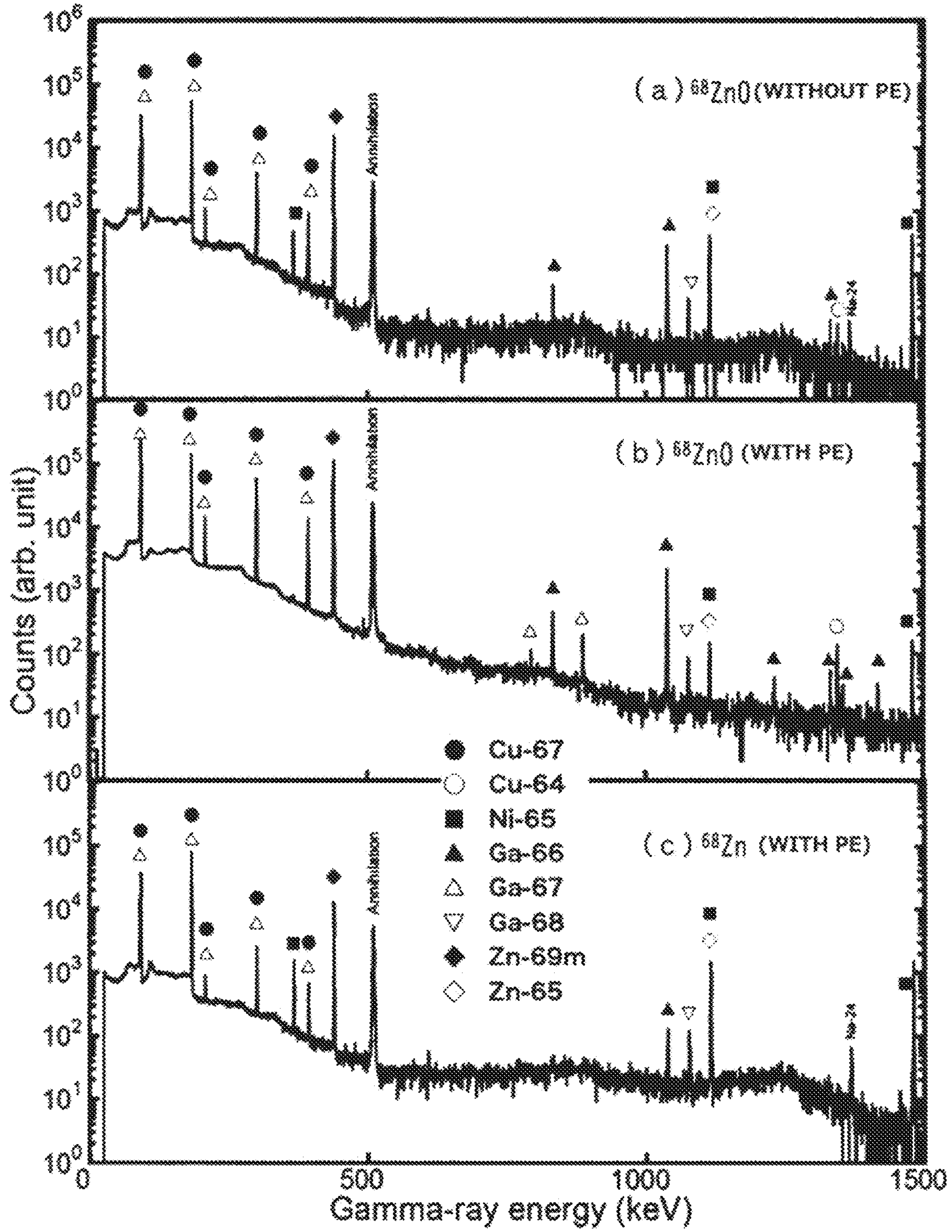
FIG. 6 is a diagram illustrating an example of γ-ray spectra, using the embodiment, from decay of radioisotopes produced in $^{68}$ZnO and $^{68}$Zn samples in which $^{68}$Zn is highly enriched.

Five laminated samples 32 of 93Nb, 68Zn-enriched 68ZnO, 64Zn-enriched 64ZnO, natural ZnO, and 90Zr-enriched 90ZrO2, and two laminated samples of 93Nb and 68Zn-enriched 68Zn disposed in the 0-degree direction (the traveling direction of deuterons) were irradiated with accelerator based neutrons 22, which were generated by irradiating berylium (20) with deuterons of 50 MeV, to generate RIs. In cases of (a) the five laminated samples (including oxidized compounds) are not covered with the neutron scattering material 40, (b) the five laminated samples (including oxidized compounds) are covered with the neutron scattering material 40 (polyethylene PE), and (c) the two laminated samples (including no oxidized compounds) are covered with the neutron scattering material 40 (PE), γ-ray spectra by the β decays of RIs generated by 68ZnO and 68Zn samples were measured with a germanium semiconductor detector. FIGS. 6A, 6B, and 6C illustrate the spectra. FIG. 6A represents a case in which there are no polyethylene blocks. FIG. 6B represents a case in which there are polyethylene blocks. FIG. 6C represents a case in which the metal 68Zn sample is used and there are polyethylene blocks.

FIG. 6B shows that when there is a polyethylene scattering material, the amounts of generation of $^{69m}$Zn, $^{67}$Ga, $^{66}$Ga, and $^{64}$Cu are higher than those in FIG. 6A, i.e. in the absence of the polyethylene scattering material, and the amounts of generation or $^{67}$Cu, $^{65}$Ni, and $^{65}$Zn are almost the same irrespective or the presence or absence of the polyethylene scattering material. FIG. 7 illustrates the types of generated RIs and amounts of generation thereof, in cases in which the $^{68}$ZnO and $^{68}$Zn samples are covered with a polyethylene or lead Pb scattering material (referred to as $^{68}$ZnO (PE), $^{68}$ZnO (Pb), and $^{68}$Zn (PE), respectively) and in which the $^{68}$ZnO and $^{68}$Zn samples are not covered with a polyethylene or lead Pb scattering material (referred to as ZnO (no scattering material)).

Here, RI represents RIs generated by the $^{68}$Zn sample, reaction represents a nuclear reaction for generating the RIs, and $E_{thr}$ (Mev) represents a threshold value of the reaction. The columns A-E represent the radioactivity (unit of kilobecquerels (kBq)) of radioisotopes generated by $^{68}$ZnO (no scattering material), $^{68}$ZnO (PE), $^{68}$ZnO (Pb), and $^{68}$Zn (PE) samples at the time of completion of irradiation. The columns F and G represent values obtained by dividing the difference between the columns B, C, and A by the value of A, and the column H is the ratio between the columns C and F. The column F represents the ratio of amounts of generation of RIs affected by the presence or absence of the scattering material. It is found out that in the case of $^{68}$ZnO, which is the oxide sample of $^{68}$Zn, the amounts of generation of $^{69m}$Zn, $^{67}$Ga, $^{66}$Ga, and $^{64}$Cu increase 19, 42, 20, and 76 times, respectively, owing to the scattering material, while the amounts of generation of $^{67}$Cu, $^{65}$Ni, and $^{65}$Zn do not depend on the presence or absence of the scattering material. It is found out from the comparison between the columns E and A that, in the case of the $^{68}Zn$ metal sample, the amount or generation is not affected by the presence or absence of the scattering material.

The same scattering material effect as in the $^{68}ZnO$ sample is obtained in the $^{64}ZnO$ and $^{90}ZrO_2$ samples performed with the five laminated samples. Note that $^{93}Nb$ is a metal, but $^{93m}Mo$ and $^{89}Zr$ generated by reactions of $^{92}Nb$ and protons are generated 14 and 45 times, respectively, owing to the scattering material.

(1b) Deuteron Energy of 40 MeV

The amount of generation of RIs by $^{68}ZnO$ and $^{93}Nb$ is independent of the presence or absence of the polyethylene scattering material.

Next, a case in which the various samples described in (2) above are disposed in different directions from 0 degree will be described. $^{198}Au$ and $^{177}Lu$ are generated in nuclear reactors and used in medicine. When accelerator based neutrons generated by deuterons of 40 MeV are reflected by the polyethylene scattering material, the reflected (scattered) neutrons in the scattering medium 42 have almost uniform energy intensity distribution. In fact, $^{197}Au$ and $^{176}Lu$ samples were disposed at different positions in the scattering medium 42, and the amounts of generation of $^{198}Au$ and $^{177}Lu$ by $^{197}Au$ (n, γ) $^{198}Au$ and $^{176}Lu$ (n, γ) $^{177}Lu$ reactions and sample position dependence thereof were investigated.

FIG. 8 illustrates experiment results and calculation results of the amounts of generation of $^{198}Au$ and $^{177}Lu$ and the position dependence of $^{197}Au$ and $^{176}Lu$ samples in the polyethylene scattering medium at deuteron energy of 40 MeV. The amounts of generation are promising for practical use, because the space for the scattering material is provided inside the neutron source so that the RIs can be generated without much loss of neutron intensity. In the polyethylene scattering medium, neutron energy intensity distribution is not strongly dependent on position and is almost uniform. This means that a large number of samples can be disposed in this scattering medium and large amounts of RIs can be generated at the same time by a single neutron irradiation, which is advantageous as an economical RI generation method.

In the above-mentioned embodiment, the neutron producing target 20 is made of beryllium and the neutron scattering material 40 is made of polyethylene, but the types of the neutron producing target 20 and neutron scattering material 40 are not limited to these. For example, another light element such as carbon or lithium can be used as the neutron producing target 20, and a material. composed of another light element such as water or paraffin can be used as the neutron scattering material 40. The shape of the neutron scattering chamber 41 and the shape of the scattering medium 42 formed therein are also not limited to a rectangular parallelepiped.

INDUSTRIAL APPLICABILITY

It is possible to generate various radioisotopes in large amounts at the same time, to be used in medicine, research, education, agriculture, industry, and the like.

REFERENCE SIGNS LIST

10 . . . deuteron accelerator
12 . . . deuteron beam
20 . . . neutron producing target
22, 22A . . . accelerator based neutron (fast neutron)
30 . . . first sample
30A . . . second neutron source
30B . . . intense neutron
30C . . . charged particle source
30D . . . charged particle
32 . . . laminated sample (first sample)
34 . . . second sample
34A . . . sample for generating short-lived radioisotopes (second sample)
34B . . . sample for generating long-lived radioisotopes (second sample)
38 . . . holder
39 . . . sample holding jig
40 . . . neutron scattering material
40A . . . first neutron source
40B . . . scattered neutron
41 . . . neutron scattering chamber
42 . . . scattering medium
43 . . . polyethylene (PE) block
44 . . . support

The invention claimed is:

1. A method for producing radioisotopes comprising:
generating neutrons by irradiating a neutron producing target with a deuteron beam accelerated by a deuteron accelerator;
directly irradiating a first sample with first neutrons produced in the neutron producing target;
producing scattered neutrons by scattering both
(i) second neutrons which have initially been scattered by a nuclear reaction in the first sample and
(ii) third neutrons which have penetrated through the first sample without being scattered by the nuclear reaction in the first sample,
by interaction of the second and third neutrons with a neutron scattering material made of polyethylene, water, or paraffin disposed around the neutron producing target and the first sample,
the interaction causing the scattered second and third neutrons to have a reduced energy; and
simultaneously generating multiple radioisotopes from the first sample and a second sample, through
(i) a nuclear reaction between the first neutrons produced in the neutron producing target and the first sample, and
(ii) a nuclear reaction between the multi-scattered neutrons generated by scattering the second and third neutrons in the neutron scattering material and both the first sample and
the second sample,
the second sample being different in material from the first sample, and
the second sample being disposed adjacent the neutron scattering material.

2. The method for producing radioisotopes according to claim 1, wherein the first sample has a laminated structure by laminating multiple materials in a direction of the deuteron beam.

3. The method for producing radioisotopes according to claim 1, wherein the second sample includes a sample disposed in a position facing the first sample, and a sample disposed in a position facing the neutron scattering material and behind the sample facing the first sample.

* * * * *